(12) United States Patent
Domps et al.

(10) Patent No.: US 11,754,118 B2
(45) Date of Patent: Sep. 12, 2023

(54) INNER HALF-RING FOR A SPHERICAL PLAIN BEARING

(71) Applicant: SKF Aerospace France S.A.S, Montigny-le-Bretonneux (FR)

(72) Inventors: Christophe Domps, Bourg de-Péage (FR); Vincent Guyard, Assieu (FR)

(73) Assignee: SKF AEROSPACE FRANCE S.A.S, Montigny-le-Bretonneux (FR)

(*) Notice: Subject to any disclaimer, the term of this patent is extended or adjusted under 35 U.S.C. 154(b) by 10 days.

(21) Appl. No.: 17/577,516

(22) Filed: Jan. 18, 2022

(65) Prior Publication Data

US 2022/0235818 A1     Jul. 28, 2022

(30) Foreign Application Priority Data

Jan. 26, 2021   (FR) ...................................... 2100720

(51) Int. Cl.
*F16C 23/04*   (2006.01)
(52) U.S. Cl.
CPC ................................ *F16C 23/045* (2013.01)
(58) Field of Classification Search
CPC ...... F16C 11/0609; F16C 23/02; F16C 23/04; F16C 23/043; F16C 23/045; F16C 33/046; F16C 33/10; F16C 33/102; F16C 33/1055; F16C 33/1065
See application file for complete search history.

(56) References Cited

U.S. PATENT DOCUMENTS

| | | | |
|---|---|---|---|
| 7,523,996 B1* | 4/2009 | Darst ...................... | F16C 25/04 384/213 |
| 9,670,954 B2* | 6/2017 | Turmeau ............... | F16C 33/124 |
| 2008/0040886 A1 | 2/2008 | Arnold et al. | |
| 2015/0252839 A1 | 9/2015 | Turmeau et al. | |

FOREIGN PATENT DOCUMENTS

| | | |
|---|---|---|
| CN | 202914529 U | 5/2013 |
| EP | 0913595 A1 | 5/1999 |

OTHER PUBLICATIONS

Preliminary Search Report from the French Patent Office dated Sep. 22, 2021 in related French application No. FR2100720, including Search Report and Written Opinion and partial translation.

* cited by examiner

*Primary Examiner* — James Pilkington
(74) *Attorney, Agent, or Firm* — J-TEK LAW PLLC; Scott T. Wakeman; Mark A. Ussai (57) ABSTRACT

An inner half-ring of a spherical plain bearing has a spherical outer surface, a cylindrical inner surface, and a first flat front face and a second flat front face delimiting the half-ring in a circumferential direction. The first and second flat front faces extend between the outer surface and the inner surface, and a first central groove is formed in the first front face and extends between the outer surface and the inner surface.

17 Claims, 8 Drawing Sheets

INNER HALF-RING FOR A SPHERICAL PLAIN BEARING

CROSS-REFERENCE

This application claims priority to French patent application no. 2100720 filed on Jan. 26, 2021, the contents of which are fully incorporated herein by reference.

TECHNOLOGICAL FIELD

The present invention relates to an inner half-ring for a spherical plain bearing, and to a corresponding spherical plain bearing.

BACKGROUND

Split metal/metal spherical plain bearings are also known by the corresponding acronym "Split MMSPB". Such spherical plain bearings have the specific feature of an inner ring split into two half-rings, the half-rings being assembled together so as to form the inner ring.

Although such a design of a spherical plain bearing is generally satisfactory, the space between the two half-rings may cause lubrication problems. Specifically, the lubricant can be supplied on the external diameter of the spherical plain bearing. In this case, it is desirable that the grease flows from the spherical zone corresponding to the external diameter as far as a bore zone located on the inside of the spherical plain bearing, in contact with the shaft. This inner zone is frequently a preferred friction zone during rotational movements, in the same way as the spherical zone.

However, it is generally found that, in the case of a split metal/metal spherical plain bearing, the grease flows towards the outside via the split interface between the two half-rings. This may cause a loss of pressure and thus prevent the grease from reaching the bore.

In order to overcome this drawback, provision has been made to add polytetrafluoroethylene (PTFE) inserts, in order to fill the gap between the two half-rings. However, the inserts can become detached over the service life of the spherical plain bearing and they increase the manufacturing cost.

SUMMARY

It is an aspect of the disclosure to address these drawbacks.

More particularly, an aspect of the disclosure is to improve the lubrication of a split metal/metal spherical plain bearing.

To that end, what is provided is an inner half-ring for a spherical plain bearing, the half-ring comprising a spherical outer surface, a cylindrical inner surface, a first and a second flat front face that delimit the half-ring in the circumferential direction, the first and second front faces extending between the outer surface and the inner surface.

According to a general feature, this half-ring comprises at least one first central groove formed on the first front face, the first central groove extending between the outer surface and the inner surface.

Such a central groove allows the grease injected between the inner ring and the outer ring to flow more towards the inside of the spherical plain bearing than towards the outside. This results in better lubrication of the spherical plain bearing.

In one embodiment, the first central groove extends radially.

According to another embodiment, the first front face is radial.

A linear channel formed on the outer surface at the edge where the outer surface meets the first front face may also be provided, the first central groove opening out in the linear channel.

The linear channel arranged in this way makes it possible to improve the effectiveness of the first central groove to allow the injected grease to flow.

The half-ring preferably also comprises a cutout, which opens out both on the outer surface and on the inner surface. The cutout may be a through opening connecting the inner surface to the outer surface.

Such a cutout, in conjunction with the groove, makes it possible to improve the flow of the grease towards the inside of the spherical plain bearing even further.

The cutout preferably extends radially.

An axial rectilinear channel formed on the inner surface may also be provided, the cutout opening out in the rectilinear channel.

The cutout and the rectilinear channel that are arranged with respect to one another in this way make it possible to improve very particularly the flow of the grease.

In one embodiment, the half-ring comprises a second central groove formed on the second front face, the second central groove extending between the outer surface and the inner surface.

Such a design makes it possible to improve the flow of the grease even further by making an additional central groove similar to the first central groove, thus increasing the manufacturing costs by only a small amount.

A first and a second secondary groove that are formed on the first front face and disposed on either side of the first central groove may also be provided.

In one embodiment, the first and second secondary grooves are parallel to the first central groove.

A circumferential channel may also be provided on the inner surface, the first central groove being disposed in the same axial plane as the circumferential channel.

As a result, the flow of the grease towards the inside of the spherical plain bearing is improved even further.

According to another aspect, a spherical plain bearing comprising an outer ring and an inner ring is proposed, the inner ring comprising at least one half-ring as defined above.

In one embodiment, the inner ring comprises two half-rings as defined above.

BRIEF DESCRIPTION OF THE DRAWINGS

Further aims, features and advantages of the invention will become apparent from reading the following detailed description, which is given purely by way of nonlimiting example and with reference to the appended drawings, in which.

DETAILED DESCRIPTION

Figure 1:
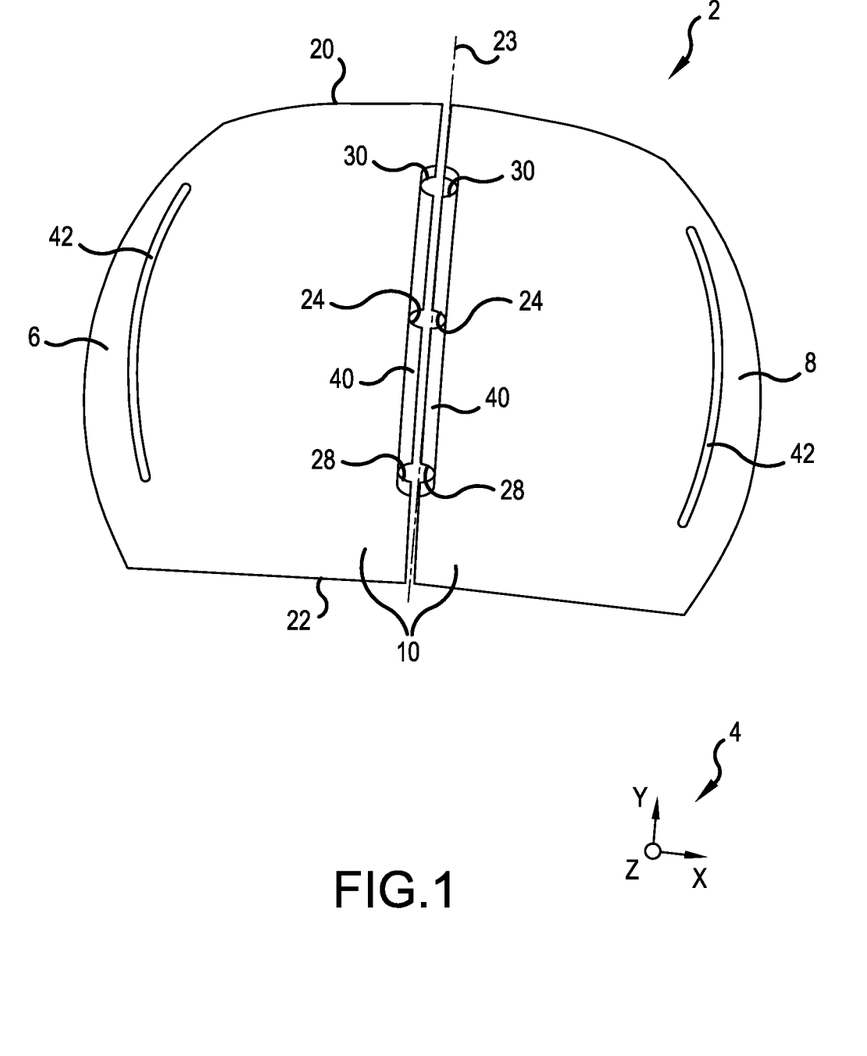
FIG. 1 is a perspective view of an inner ring according to a first embodiment of the present disclosure which includes a first half-ring and a second half-ring.
Figure 8:
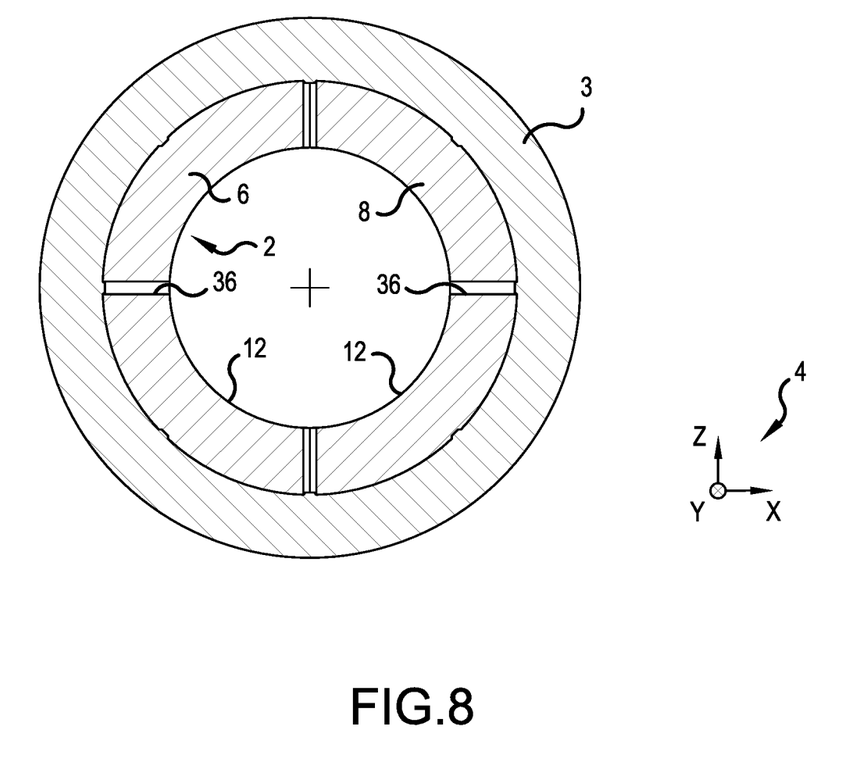
FIG. 8 is a sectional view of a spherical plain bearing including an outer ring and the inner ring of FIG. 1.

With reference to FIG. 1, an inner ring 2 is schematically shown. The inner ring 2 is intended to be incorporated in a spherical plain bearing shown in FIG. 8. In the example illustrated, the spherical plain bearing formed by the inner ring 2 is a split metal/metal spherical plain bearing. The spherical plain bearing comprises an outer ring 3 mounted in a swiveling manner against the outer surface of the inner ring 2.

A direct orthonormal vector base 4 associated with the inner ring 2 is defined. The vector base 4 is composed of a vector X, a vector Y and a vector Z.

The inner ring 2 is intended to be received in an outer ring 3 so as to implement a swivel connection, namely a mechanical connection with three degrees of rotational freedom and zero degrees of translational freedom. It may also implement a linear annular connection, namely a mechanical connection with three degrees of rotational freedom and one degree of translational freedom.

The inner ring 2 is formed from two half-rings 6 and 8. The half-rings 6 and 8 are partial elements that make up the inner ring 2.

Figure 2:
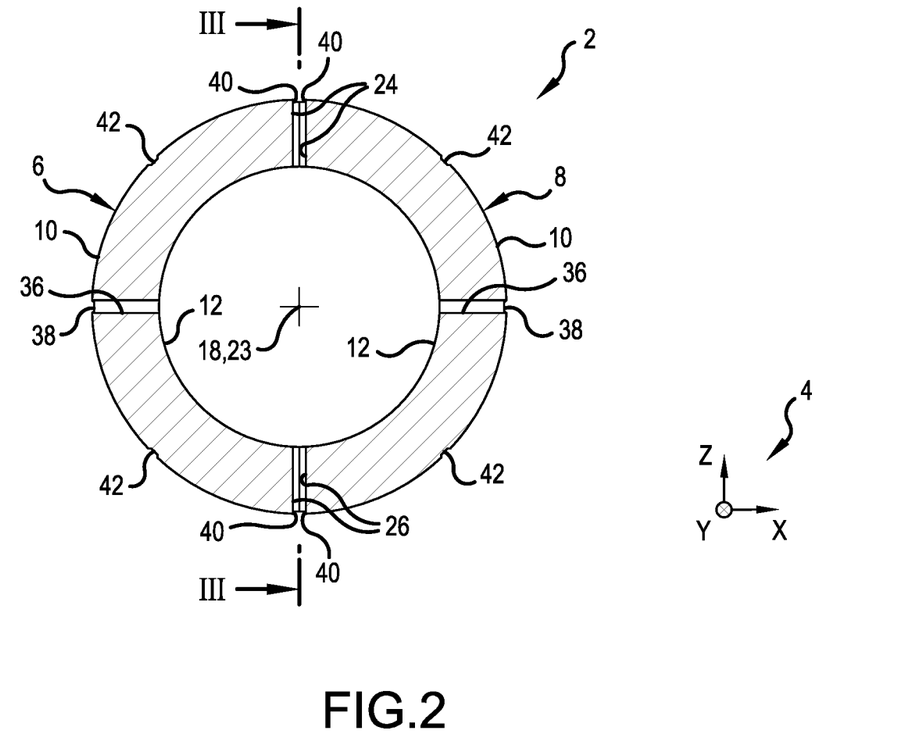
FIG. 2 is a sectional view of the inner ring of FIG. 1.
Figure 3:
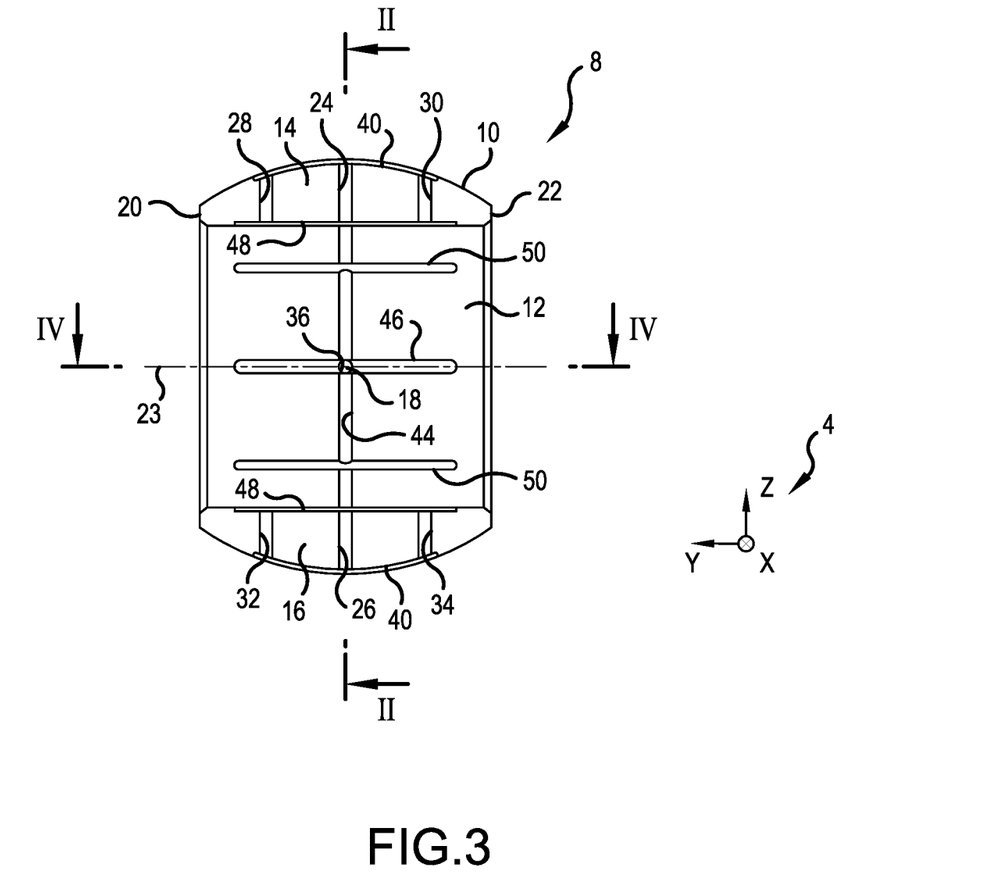
FIG. 3 is a side elevational view of the first half-ring of FIGS. 1.
Figure 4:
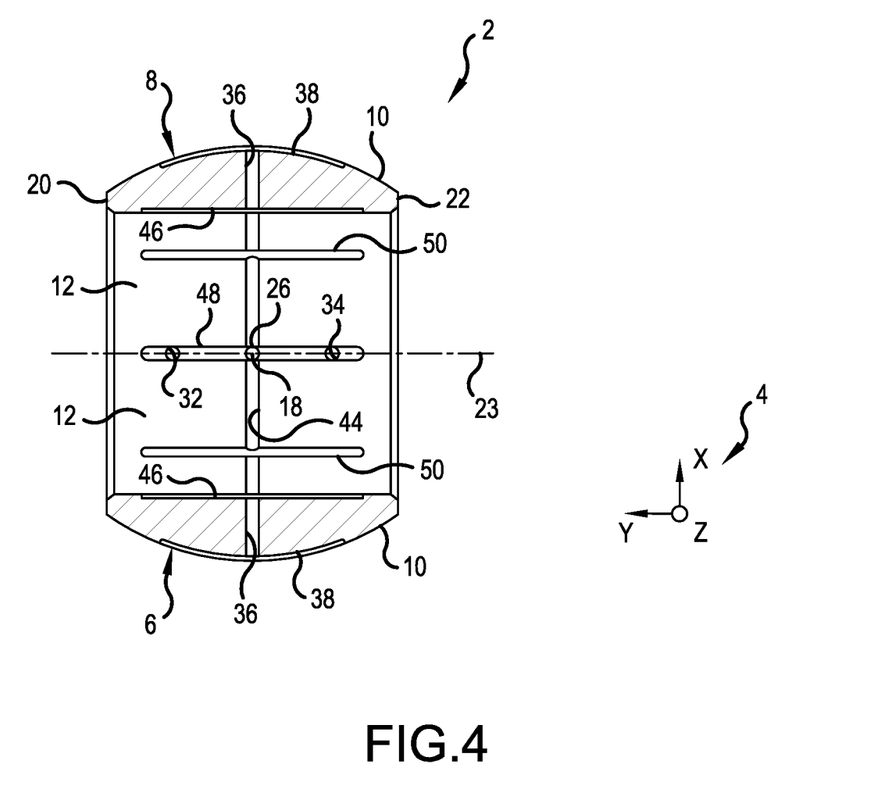
FIG. 4 is a sectional view of the first half-ring of FIG. 3.

As can be seen in FIGS. 2 to 4, the half-rings 6 and 8 are substantially identical and symmetrical with respect to a plane that is perpendicular to the vector X. As a result, only the half-ring 6 will be described below, it being understood that this description also applies to the half-ring 8.

The half-ring 6 has an outer surface 10, an inner surface 12 and two front faces 14 and 16.

The outer surface 10 is spherical about a center 18. The outer ring 3 of the spherical plain bearing is thus mounted in spherical contact against the outer surfaces 10 of each half-ring 6 and 8. The spherical outer surface 10 is truncated at two end faces 20 and 22. The end faces 20 and 22 are flat and perpendicular to the vector Y. The end faces 20 and 22 have an outer contour that is circular about the vector Y. The circular outer contours of the end faces 20 and 22 have the same diameter.

The inner surface 12 is a cylinder of revolution about an axis 23 that includes the center 18 and is parallel to the vector Y. In the direction of the vector Y, the surface 12 extends between the end faces 20 and 22. As a result, the inner contour of the end faces 20 and 22 is circular and the diameter of the inner surface 12 is equal to the diameter of the circular inner contour of the faces 20 and 22, give or take the chamfers.

In the present application, the terms "radial", "axial" and "circumferential", and the terms derived therefrom, will be understood as referring to the cylindrical inner surface 12.

Moreover, in the present application, the term "cylindrical" will be understood in accordance with its general definition, namely that a cylindrical surface is a surface made up of all the points on all the lines that are parallel to a given line and that pass through a plane curve set in a plane that is not parallel to the given line.

The front faces 14 and 16 are flat and perpendicular to the vector X. The front faces 14 and 16 are substantially disposed in one and the same plane that includes the center 18. As a result, a radius of the outer surface 10 is substantially included in the plane of the faces 14 and 16, which are therefore radial.

In the present application, it is understood that a surface is substantially disposed in the plane that includes the center 18 if this surface is offset with respect to such a plane by an offset less than or equal to the play typically present between the two half-rings of a split metal/metal spherical plain bearing. For example, in a split metal/metal spherical plain bearing with play, the offset in the direction of the vector X between the front face 14 or 16 and the center 18 can typically be between 0.3 mm and 0.4 mm. In a split metal/metal spherical plain bearing without play, the offset between the front face 14 or 16 and the plane that is perpendicular to the vector X and includes the center 18 can typically be between 0.03 mm and 0.07 mm.

The front faces 14 and 16 are delimited radially on the outside by the outer surface 10. The front faces 14 and 16 are delimited radially on the inside by the inner surface 12. The front faces 14 and 16 are axially delimited by the end faces 20 and 22. The front faces 14 and 16 delimit the half-ring 6 in the circumferential direction.

The half-ring 6 has a central groove 24 on the front face 14 and a central groove 26 on the front face 16. The grooves 24 and 26 face one another radially. The grooves 24 and 26 are central since they are equidistant, in the direction of the vector Y, from the end faces 20 and 22. The central grooves 24 and 26 are rectilinear and radial. In other words, the central grooves 24 and 26 are oriented in the direction of the radius of the spherical outer surface 10. In the example illustrated, the central grooves 24 and 26 are perpendicular to the axis 23.

The central grooves 24 and 26 extend over the entire radial thickness of the front faces 14 and 16, respectively, that is to say between the surfaces 10 and 12.

As can be seen in FIG. 3, the half-ring 6 has four secondary grooves 28, 30, 32 and 34. The secondary grooves 28 and 30 are on the front face 14. The secondary grooves 32 and 34 are on the front face 16. The secondary grooves 28 and 30 are disposed axially on each side of the central groove 24. The secondary grooves 32 and 34 are disposed axially on each side of the central groove 26. The secondary grooves 28, 30, 32 and 34 are rectilinear and perpendicular to the axis 23. The secondary grooves 28, 30, 32 and 34 extend radially over the entire thickness of the half-ring 6, that is to say between the surfaces 10 and 12.

The grooves 24, 26, 28, 30, 32 and 34 have a semicircular cross section with the same diameter. Without departing from the scope of the invention, it is possible to envisage different diameters for the various grooves or else a first diameter for the central grooves 24 and 26 and a second diameter, different from the first diameter, for the secondary grooves 28, 30, 32 and 34.

The half-ring 6 has a cutout 36. The cutout 36 is rectilinear and radial. In the example illustrated, the cutout 36 is equidistant between the front faces 14 and 16. The cutout 36 is parallel to the vector X.

The cutout 36 is through-opening. In other words, the cutout 36 extends radially between the surfaces 10 and 12. The cutout 36 has a circular cross section with a diameter that is substantially equal to the diameter.

The half-ring 6 has a central linear channel 38, two end linear channels 40 and two intermediate linear channels 42. The linear channels 38, 40 and 42 are curved.

As can be seen in FIG. 2, the linear channels 38, 40 and 42 are on the outer surface 10. More particularly, the end linear channels 40 are on the edge between the outer surface 10 and each of the front faces 14 and 16. The central linear channel 38 is equidistant from the end linear channels 40. Each intermediate linear channel 42 is equidistant from the central linear channel 38 and a respective end linear channel 40.

The grooves 24, 28 and 30 thus open out radially on the outside in an end linear channel 40 and the grooves 26, 32 and 34 open out radially on the outside in the other end linear channel 40. The cutout 36 opens out radially on the outside in the central linear channel 38.

As can be seen in FIGS. 3 and 4, the half-ring 6 has a channel 44.

The channel 44 is on the inner surface 12. The channel 44 extends in the circumferential direction. As a result, the channel 44 is continuous in a plane that is perpendicular to the vector X. The channel 44 extends over the entire circumference of the inner surface 12 between the front faces 14 and 16. The channel 44 is central or, in other words, is located equidistantly from the end faces 20 and 22.

As a result, the central grooves 24 and 26 and the cutout 36 open out radially on the inside in the channel 44. In other words, there is no axial offset between the cutout 36, the central grooves 24 and 26 and the channel 44.

The half-ring 6 has a central rectilinear channel 46, two end rectilinear channels 48 and two intermediate rectilinear channels 50.

The rectilinear channels 46, 48 and 50 are on the inner surface 12. More specifically, the end rectilinear channels 48 are on the edge between the inner surface 12 and each of the front faces 14 and 16. The central rectilinear channel 46 is equidistant from the end rectilinear channels 48. Each intermediate rectilinear channel 50 is equidistant between the central rectilinear channel 46 and a respective end rectilinear channel 48.

The rectilinear channels 46, 48 and 50 are parallel to the direction of the vector Y. The rectilinear channels 46, 48 and 50 have a length of between 60% and 90% of the distance between the end faces 20 and 22.

On account of this arrangement, the grooves 24, 26, 28, 30, 32 and 34 open out radially on the inside in the end rectilinear channels 48. The cutout 36 opens out radially on the inside in the central rectilinear channel 46.

The grooves 24, 26, 28, 30, 32 and 34 and the cutout 36 make it possible as a result to promote the flow of the lubricating grease towards the bore formed by the cylindrical inner surface 12. The channels 38, 40, 42, 44, 46, 48 and 50 make it possible to improve this flow even further. This promoted flow is obtained whilst still ensuring that the half-ring 6 has good mechanical strength, by virtue of the relative arrangement of the grooves 24, 26, 28, 30, 32 and 34 and of the channels 38, 40, 42, 44, 46, 48 and 50 that has been described.

Figure 5:
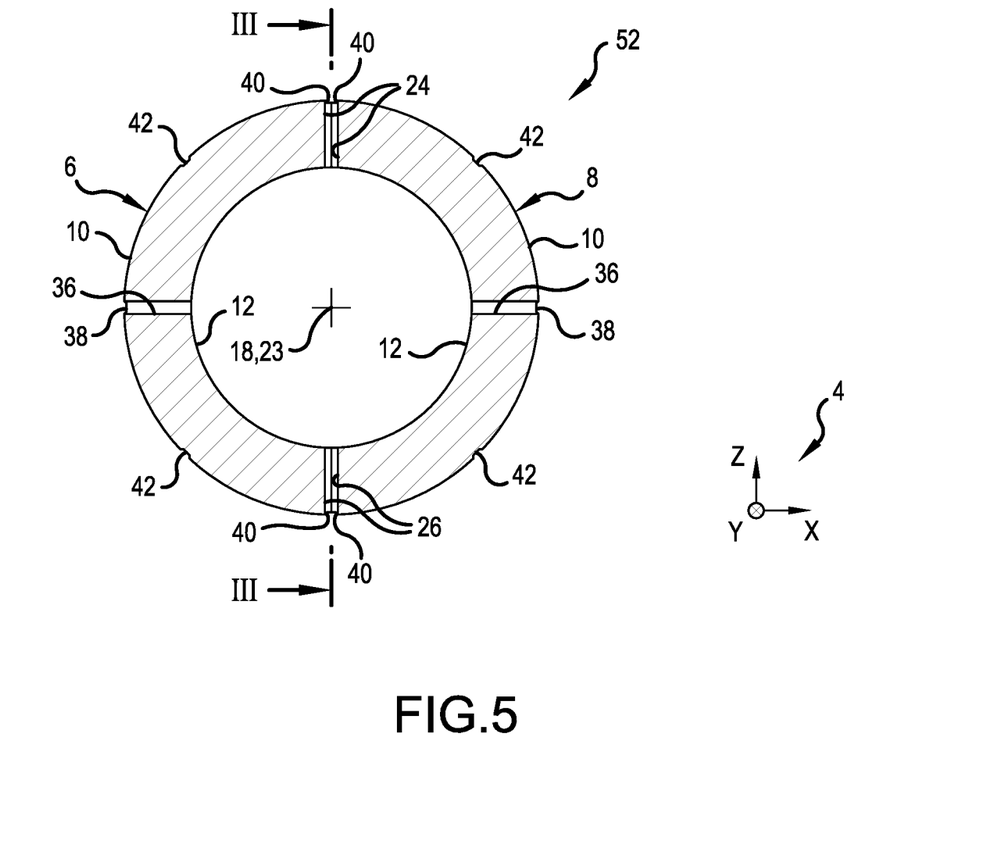
FIG. 5 is a sectional view of an inner ring according to a second embodiment of the invention, which includes a first half-ring and a second half-ring.
Figure 6:
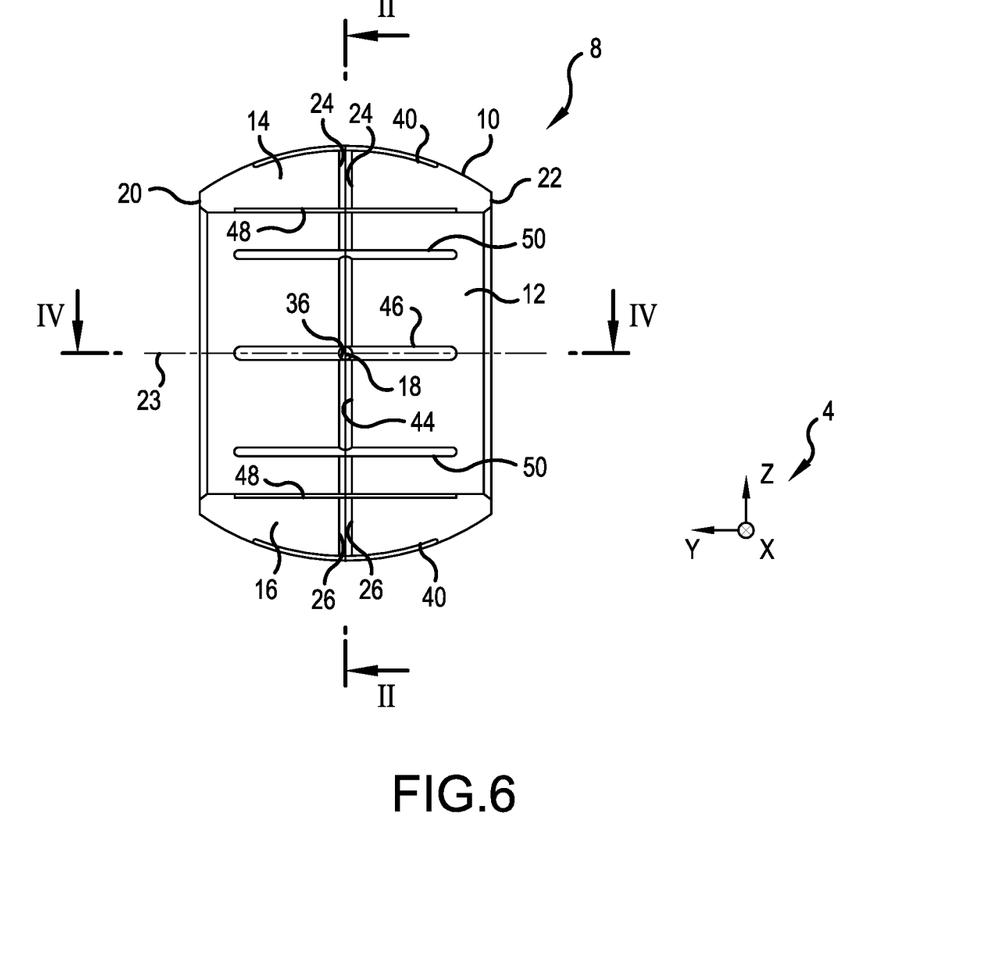
FIG. 6 is a side elevational view of the first half-ring of the inner ring of FIG. 5.
Figure 7:
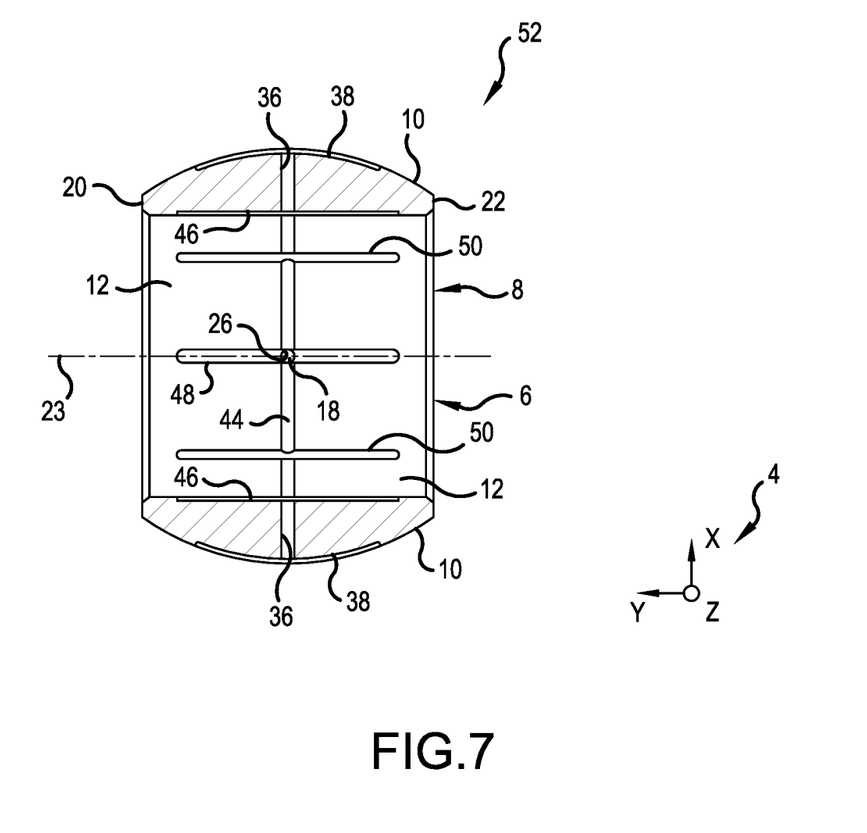
FIG. 7 is a sectional view of the first half-ring of FIG. 6.

With reference to FIGS. 5 to 7, an inner ring 52 according to a second embodiment of the disclosure is schematically shown. The identical elements bear the same references.

The inner ring 52 differs from the inner ring 2 in that the half-rings 6 and 8 do not have secondary grooves 28, 30, 32 and 34. In other words, only the central grooves 24 and 26 are provided on the front faces 14 and 16 of the half-rings 6 and 8.

In this embodiment, the flow of the grease used to lubricate the split metal/metal spherical plain bearing can be improved, in particular between the bore defined by the cylindrical inner surface 12 and the outer spherical surface 10.

Without departing from the scope of the invention, it is moreover possible to envisage providing only a single one of the two central grooves 24 and 26.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide inner rings for spherical plain bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A spherical plain bearing, comprising:
   an outer ring, and
   an inner ring comprising a first inner half-ring and a second inner half-ring, each of the first and second inner half-rings having:
   a spherical outer surface,
   a cylindrical inner surface,
   a first flat front face and a second flat front face delimiting the half-ring in a circumferential direction, the first and second flat front faces extending between the outer surface and the inner surface, and
   a first central groove in the first front face extending between the outer surface and the inner surface,
   wherein the inner ring is mounted in the outer ring for pivotal and rotational movement relative to the outer ring.

2. The spherical plain bearing according to claim 1, wherein the first central groove extends radially.

3. The spherical plain bearing according to claim 1, including a radial through opening having a first end opening to the outer surface and a second end opening to the inner surface.

4. The spherical plain bearing according to claim 3, including an axial rectilinear channel in the inner surface, wherein the second end opening of the radial through opening is located in the rectilinear channel.

5. The spherical plain bearing according to claim 1, including a second central groove formed on the second front face, the second central groove extending between the outer surface and the inner surface.

6. The spherical plain bearing according to claim 1, including a circumferential channel in the inner surface, wherein the first central groove is disposed in the same axial plane as the circumferential channel.

7. The spherical plain bearing according to claim 1, including:
a second central groove in the second front face that extends between the outer surface and the inner surface;
a first secondary groove in the first front face on a first side of the first central groove and a second secondary groove in the first front face on a second side of the first central groove;
a third secondary groove in the second front face on a first side of the second central groove and a fourth secondary groove in the second front face on a second side of the second central groove;
a linear channel on the outer surface at an edge at which the outer surface meets the first front face, the first central groove having an end opening in the linear channel;
a radial through opening having a first end opening to the outer surface and a second end opening to the inner surface; and
an axial rectilinear channel in the inner surface, the second end opening of the radial through opening being located in the rectilinear channel.

8. The spherical plain bearing according to claim 1, wherein the outer surface of each of the first and second inner half-rings includes a linear channel formed at an edge at which the outer surface meets the first front face, and
wherein the first central groove has an end opening in the linear channel.

9. The spherical plain bearing according to claim 1, wherein each of the first and second inner half-rings includes a first secondary groove in the first front face on a first side of the first central groove and a second secondary groove in the first front face on a second side of the first central groove.

10. An inner half-ring of a spherical plain bearing, comprising:
a spherical outer surface,
a cylindrical inner surface,
a first flat front face and a second flat front face delimiting the half-ring in a circumferential direction, the first and second flat front faces extending between the outer surface and the inner surface,
a first central groove in the first front face extending between the outer surface and the inner surface, and
a linear channel formed on the outer surface at an edge at which the outer surface meets the first front face,
wherein the first central groove has an end opening in the linear channel.

11. The half-ring according to claim 10, including a radial through opening having a first end opening to the outer surface and a second end opening to the inner surface.

12. The half-ring according to claim 11, including an axial rectilinear channel in the inner surface, wherein the second end opening of the radial through opening is located in the rectilinear channel.

13. The half-ring according to claim 10, including a first secondary groove in the first front face on a first side of the first central groove and a second secondary groove in the first front face on a second side of the first central groove.

14. An inner half-ring of a spherical plain bearing, comprising:
a spherical outer surface,
a cylindrical inner surface,
a first flat front face and a second flat front face delimiting the half-ring in a circumferential direction, the first and second flat front faces extending between the outer surface and the inner surface,
a first central groove in the first front face extending between the outer surface and the inner surface, and
a first secondary groove in the first front face on a first side of the first central groove and a second secondary groove in the first front face on a second side of the first central groove.

15. The half-ring according to claim 14, wherein the first secondary groove and the second secondary groove are parallel to the first central groove.

16. The half-ring according to claim 14, including a radial through opening having a first end opening to the outer surface and a second end opening to the inner surface.

17. The half-ring according to claim 16, including an axial rectilinear channel in the inner surface, wherein the second end opening of the radial through opening is located in the rectilinear channel.

* * * * *